(12) United States Patent
Rice et al.

(10) Patent No.: US 8,715,409 B2
(45) Date of Patent: May 6, 2014

(54) FAST SETTING LOW PERMEABILITY CEMENT AND CONCRETE

(75) Inventors: Edward K. Rice, Los Angeles, CA (US); Grant M. Kao, Rowland Heights, CA (US); Eric P. Bescher, Los Angeles, CA (US)

(73) Assignee: PKL Corporation, Los Angeles, CA (US)

( * ) Notice: Subject to any disclaimer, the term of this patent is extended or adjusted under 35 U.S.C. 154(b) by 437 days.

(21) Appl. No.: 13/103,029

(22) Filed: May 6, 2011

(65) Prior Publication Data

US 2011/0297047 A1    Dec. 8, 2011

Related U.S. Application Data

(60) Provisional application No. 61/332,657, filed on May 7, 2010.

(51) Int. Cl.
*C04B 14/48* (2006.01)

(52) U.S. Cl.
USPC .............. 106/644; 106/713; 428/703; 52/414

(58) Field of Classification Search
USPC .................... 106/644, 713; 428/703; 52/414
See application file for complete search history.

(56) References Cited

U.S. PATENT DOCUMENTS

| | | | |
|---|---|---|---|
| 3,043,790 A | 7/1962 | Sanders et al. | |
| 3,860,433 A | 1/1975 | Ost et al. | |
| 3,895,953 A | 7/1975 | Mehta | |
| 4,086,201 A | 4/1978 | Peters et al. | |
| 4,419,136 A | 12/1983 | Rice | |
| 4,513,040 A * | 4/1985 | Lankard | 428/49 |
| 4,957,556 A | 9/1990 | Kunbargi | |
| 5,114,487 A * | 5/1992 | Gartshore et al. | 106/695 |
| 5,503,670 A * | 4/1996 | Richard et al. | 106/643 |
| 5,846,316 A | 12/1998 | Rice | |
| 7,419,543 B2 * | 9/2008 | Destree | 106/640 |
| 2007/0132150 A1 | 6/2007 | Rice et al. | |

OTHER PUBLICATIONS

Elotex Copra900 Primary Technical Datasheet (Jun. 2007).

* cited by examiner

*Primary Examiner* — Paul Marcantoni
(74) *Attorney, Agent, or Firm* — Kenneth H. Ohriner; Perkins Coie LLP

(57) ABSTRACT

A calcium sulfoaluminate-based concrete with a permeability of less than 1000 Coulombs. Rapid-setting low chloride-ion permeability calcium sulfoaluminate (CSA) cements and concretes include CSA and a suitable polymer such as a sol-gel derived, organic-inorganic, silica based hybrid coating solutions of polystyrene-butylacrylate polymers containing active silanol groups protected by hydroxyl groups containing polyalcohol, or other polymers. Such polymers may be added as powders or as liquid in the finish mill. Other rapid-setting low chloride-ion permeability (CSA) cements and concretes include CSA with selected particle size distributions, and do not require use of any polymer. These CSA cements and concretes have low chloride-ion permeability, high early strength, fast setting times, low-shrinkage, and high freeze-thaw resistance.

14 Claims, 3 Drawing Sheets

FAST SETTING LOW PERMEABILITY CEMENT AND CONCRETE

CROSS-REFERENCE TO RELATED APPLICATIONS

This application claims priority to U.S. Provisional Application Ser. No. 61/332,657 filed May 7, 2010, which is incorporated herein by reference.

BACKGROUND OF THE INVENTION

Concrete and mortar structures can degrade and even fail due to aging, freeze/thaw cycles, deicing salts, shrinkage cracking, and other environmental effects. Reducing corrosion in reinforced steel concrete is a major challenge. Corrosion of reinforcing steel in a concrete structure is caused by natural environmental effects, such as reactions with chloride ions from salt water and deicing salts applied to the surface of the concrete. Chloride ions migrate through the concrete and corrode the embedded reinforcing steel. The ability of chlorides to migrate through the concrete is referred to as the chloride ion permeability of the concrete. In low permeability concrete, the rate at which chloride ions come into contact with the steel is low, which increases the stability of the embedded steel.

The permeability of unmodified, ordinary Portland cement (OPC) ranges from 3,500 to 12,000 coulombs as determined by ASTM C 1202. Permeability is generally reported at the age of 28 days. Table I below lists the chloride-ion permeability of various concretes. The abbreviation w/c is the water to cement ratio.

TABLE I

| Chloride Permeability | Charge Passing (Coulombs) | Typical Concrete Type |
|---|---|---|
| High | >4000 | High w/c ratio (>0.60) conventional OPC concrete |
| Moderate | 2000 to 4000 | Moderate w/c ratio (0.40-0.50) conventional OPC concrete |
| Low | 1000 to 2000 | Low w/c (<0.40) conventional OPC concrete |
| Very Low | 100 to 1000 | Latex-modified concrete, internally sealed concrete |
| Negligible | <100 | Polymer-impregnated concrete, polymer concrete |

Beginning in the 1960s or earlier, polymer latex was added to Portland cement to provide a low permeability concrete, as described in U.S. Pat. Nos. 4,086,201, 3,043,790, and 3,895,953, incorporated herein by reference. As used in concrete, latex is known for its plasticizing and adhesion properties and can improve tensile strength, compressive strength, and flexural strength, while also reducing permeability by filling in the large porosity of OPC matrices. Latex modified concrete has been used for bridge deck overlays, patching, and full depth pavement repairs, as it tends to be more durable in environments involving intensive free-thaw cycles and exposure to high salt concentrations.

Notwithstanding these advantages, latex modified concrete remains in limited use. The high cost of the latex polymer is a significant drawback. It is generally provided in two to three component systems, which complicates storage and handling. Indeed, storage and handling is a major factor in the cost of latex modified concrete. Since latex modified concrete has a short working time, it must be placed soon after mixing with OPC, and it cannot be transported over long distances. Consequently, a special mobile vehicle is required to store and dispense the two or three part latex blend into the concrete mixer at or very near to the job site. Typical latex modified concrete is 4-7 times more expensive than OPC concrete and is therefore only used in harsh environments. Hence, improved, easier to handle low permeability cements, mortars and concretes are needed.

While low permeability, traditional OPC concretes have been successfully manufactured, they still exhibit the undesirable characteristics of OPC: long setting times, low durability and high shrinkage. Rapid setting cements, such as those based on calcium sulfoaluminate as described in U.S. Pat. No. 3,860,433, incorporated herein by reference, have short setting times which allow re-opening of a bridge within hours of its closure instead of days.

SUMMARY OF THE INVENTION

Two new rapid-setting, low permeability cements (RSLPC) mortars, grouts and concretes have been invented. A first new RSLPC may include a blend of calcium sulfoaluminate cement with an aqueous silicate/siloxane redispersible liquid or powder polymer. A second new low permeability cement may be a polymer-free calcium sulfoaluminate cement with a particle size distribution that has been optimized to yield the low permeability. These two types of cements may be mixed with water, sand, aggregate, and other materials to make low permeability mortars, grouts and concretes.

I. DEFINITIONS AND ABBREVIATIONS USED IN THIS APPLICATION

Cement: any substance provided (at least at one time in the manufacturing process) in a powdered or granular form, that when mixed with a suitable amount of water, can form a paste that can be placed, poured, or molded to set as a solid mass.

ASTM: The American Society for Testing and Materials

Rapid Chloride Ion Penetration: concrete property obtained from ASTM C1202, indication of the concrete ability to resist chloride ion penetration.

Freeze-Thaw Resistance: concrete property obtained using ASTM C666, the standard test method for resistance of concrete to rapid freezing and thawing.

Strength: physical property obtained from ASTM C39 (Standard Test Method for Compressive Strength of Cylindrical Concrete Specimens), ASTM C1404 (Standard Test Method for Bond Strength of Adhesive Systems Used with Concrete as Measured by Direct Tension, ASTM C882 (Standard Test Method for Bond Strength of Epoxy-Resin Systems Used With Concrete by Slant Shear), ASTM C418 (Abrasion Resistance of Concrete by Sandblasting).

Early Strength: attribute obtained from ASTM C191 which is the standard test method for Time of Setting of Hydraulic Cement by Vicat Needle.

Shrinkage: property tested using ASTM C157 (Standard Test Method for Length Change of Hardened Hydraulic-Cement, Mortar, and Concrete).

Polymer: a polystyrene-butylacrylate polymer containing active silanol groups protected by hydroxyl groups containing polyalcohol.

Polymer Cement: a cements such as Portland cement, calcium aluminate, or a calcium sulfoaluminate cement, mortar or concrete made using Polymer (or an equivalent)

OPC: Ordinary Portland cement.

w/c: water to cement ratio

RSLPC: Rapid Setting Low Permeability Cement

CSA: Calcium Sulfoaluminate

I. DETAILED DESCRIPTION OF LOW PERMEABILITY FAST SETTING POLYMER CEMENT

A low permeability fast-setting cement may be made from a fast setting calcium sulfoaluminate cement and a polystyrene-butylacrylate polymer. The polymer contains active silanol groups that are protected by hydroxyl groups containing polyalcohol (referred to below simply as "Polymer"). The Polymer is a newly invented polymer available as Permguard™ polymer from Chemat Technology, Inc., Northridge, Calif. This Polymer is a sol-gel derived, organic-inorganic, silica based hybrid coating solution for anti-corrosion applications. While the organic part or the polymer provides the corrosion resistance, the inorganic part or the silanol group can form a strong bond with inorganic substrates such as sand, rock, and cement containing materials. The apparent working mechanism of the Polymer is as follows:

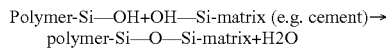
Polymer-Si—OH+OH—Si-matrix (e.g. cement)→
polymer-Si—O—Si-matrix+H2O

This Polymer does not readily polymerize or agglomerate and because the active silanol group is under the protection of another polymer. The Polymer provides anticorrosion and hydrophobic characteristics to the cement paste. The weight dosage of the Polymer is 0.01%-4.0% by weight of the cement.

Another polymer that may be used is polyvinylalcohol encapsulated siloxane available as Elotex Copra 900 from Akzo Nobel SPG LLC, Bridgewater, N.J. This polymer is different from the new Chemat Technologies polymer. Like Permguard, the Elotex Copra 900 polymer provides anticorrosion and hydrophobic characteristics to a cement paste.

While the Polymer additives can be added to a wide range of hydraulic cements, including and not limited to Portland and calcium aluminate cements, the amount of Polymer needed with such cements is nearly an order of magnitude larger an what is required with calcium sulfoaluminate cement. A typical dosage for Portland cement is about 4-8 times the amount used for fast-setting calcium sulfoaluminate cement, presumably because the porosity of non-CSA cements is larger.

The polymer modified CSA cements can be made in three ways. A first method is to mechanically mix a dried Polymer powder to the dry cement/mortar/concrete. To use a liquid Polymer, the liquid Polymer is preferentially diluted with water before adding any liquid/water to dry materials. The third method is to add the liquid Polymer during the cement manufacturing process in the finish mill, when the clinker is being ground. The liquid Polymer added at a controlled rate to the un-ground hydraulic clinker and ground in the finish mill to form a finished polymer-modified cement product. The temperatures in the finish mill of 80-110° C. do not alter or destroy the polymer.

Many times rapid-setting cements can be produced that sets too fast for practical use. In this case, an organic retarder may be used such as citric acid. A granular, powder or liquid citric acid can be introduced into the cement in two ways. The first method is to mechanically mix citric acid. If liquid citric acid is used, it may be added to water before adding it to the cement. If granular citric acid is used, it may be mixed with the dry cement before adding water. The second method is to add the liquid citric acid into the finish mill during the cement manufacturing process.

The cement provides easy to use single component cement offering freeze-thaw resistance, low rapid chloride ion penetration, fast setting with high early strength, low shrinkage, and corrosion resistance when aggregates and water are added. The Polymer additive and cement mix may be provided in both bagged and bulk applications. Bagged products are typically used for smaller jobs such as for patching, doweling, anchoring, grouting, airport and highway general repairs. Bulk products are generally for larger jobs such as repairing roadway pavement, bridge decks, industrial floors, and garage decks, vertical and overhead repairs.

Examples of Low Permeability, Fast Setting Sulfoaluminate Cement/Polymer Concrete Example 1

A typical bulk mix: Cement: 10-25% of total mix; Polymer: 0.01%-4.0%; Fine Aggregate (Sand): 10-70%; and Coarse Aggregate (⅜"-1" Rock): 10-70%.

Example 2

A typical bag mix: Cement: 15-50% of total mix; Polymer: 0.5%-4.0%; Fine Aggregate (Sand): 10-85%; and Coarse Aggregate (⅜"-1" Rock): 0-60%

The physical parameters are based on a bulk 7-sack bridge deck overlay mix design 17.75% Cement, 39.10% Coarse Aggregate, 43.15% Fine Aggregate with water to cement ratio 0.45:

Concrete Characteristics

ASTM C191 Setting Time (Vicat): Initial Set: 15-40 minutes. Final Set: 25-50 minutes.

ASTM C39 Compressive Strength 2 hours: 2000-4000 psi; 3 hours: 3000-5000 psi; 6 hours: 4000-6000 psi; 24 hours: 6000-8000 psi; 7 days: 6000-9000 psi; 28 days: 6000-10000 psi.

TABLE 2

Physical Characteristics of Low Permeability Concrete

| | |
|---|---|
| ASTM C882 Bond Strength | ASTM C1202 Rapid Chloride Ion Penetration |
| 24 hours: 1000-1500 psi | |
| 7 days: 1500-2500 psi | 28 days: 10-900 coulombs |
| 28 days: 2000-3000 psi | |
| ASTM C157 Length Change | ASTM C666 Freeze-Thaw |
| 7 days: 0.003% | 300 cycles (Durability Factor): 98-105 |
| 28 days: 0.023% | 1000 cycles (Durability Factor): 115 |

TABLE 2-continued

Physical Characteristics of Low Permeability Concrete

| ASTM C1404 Tensile Bond Strength | Specific Gravity of Cement |
|---|---|
| 24 hours: 200-300 psi | 2.85-3.00 g/cm³ |
| ASTM C418 Abrasion Resistance | |
| Mass of Clay: 3.86 grams | |
| Cavity Volume: 1.93 (cm3), 0.118 (in3) | |

The values in Table 2 above may vary with retarder dosages, environmental effects, aggregate properties, and other project variables. The physical parameters are based on a bagged mortar mix design 32.79% Cement, 0.55% Melamine Sulfonate superplasticizer, 66.66% Washed Concrete Sand (ASTM C33) with water to cement ratio 0.40.

TABLE 3

Physical Characteristics of Low Permeability Mortar

| ASTM C39 Compressive Strength | ASTM C882 Bond Strength |
|---|---|
| 3 hours: 5000-6000 psi | 24 hours: 1000-2000 psi |
| 24 hours: 6000-8000 psi | 7 days: 2000-2500 psi |
| 7 days: 8000-9000 psi | 28 days: 2300-3000 psi |
| 28 days: 8500-10000 psi | |
| ASTM C1202 Rapid Chloride Ion Penetration | ASTM C157 Length Change |
| | 7 days: 0.003% |
| 28 days: 50-900 coulombs | 28 days: 0.023% |
| ASTM C666 Freeze-Thaw | Specific Gravity of Cement |
| 300 cycles (Durability Factor): 98-105; | 2.85-3.00 g/cm³ |
| weight loss %: 0.22%. | |
| 1000 cycles (Durability Factor): 115; | |
| weight loss %: 0.32%. | |

ASTM C191 Setting Time (Vicat): Initial Set: 15-25 minutes. Final Set: 25-40 minutes.

All tests were run in accordance with each individual ASTM method. Again, the values stated here may vary with retarder dosing, environmental effects of the localized area, aggregate properties, and other field conditions.

TABLE 4

Manufacture of Low Permeability, polymer-modified Rapid Setting CSA Cement through grinding into a finish mill

| Mix No. | Clinker % | Gypsum % | Clinker Wt. (grams) | Gypsum (grams) | Liquid Polymer (mL) | Clean Potable Water (mL) |
|---|---|---|---|---|---|---|
| 1 | 94 | 6 | 1410 | 90 | 9 | 0 |
| 2 | 94 | 6 | 1410 | 90 | 18 | 0 |
| 3 | 94 | 6 | 1410 | 90 | 36 | 0 |
| 4 | 94 | 6 | 1410 | 90 | 36 | 36 |
| 5 | 94 | 6 | 1410 | 90 | 36 | 108 |

Water was added to the liquid Polymer to determine its optimum dosage into the cement.

Procedure

1. The laboratory ball mill was heated to 100° C. The ball mill temperature was monitored using an infrared thermometer gun. 100° C. is a typical temperature for a cement finish mill.
2. 1410 g of clinker added to the mill.
3. 90 g of gypsum added to the mill.
4. The selected amount of Polymer was added into the mill at the onset of grinding. This step was omitted for Mix 6 which is the control mix.
5. Grinding was stopped when a surface area of 6000 Blaine was achieved.
6. For mixes 4 and 5, the liquid Polymer and water was dissolved in water prior to addition.

Results

TABLE 5

Physical Results of Low Permeability Cement with Liquid Polymer

| | Low P Ball Mill Data | | | | Mortar Compressive Strength ASTM C109* (psi) | | | Concrete Rapid Chloride Ion Penetration ASTM C1202 |
|---|---|---|---|---|---|---|---|---|
| Mix | Blaine Surface Area | Flow | Initial Set | Final Set | 1.5 Hours | 24 Hours | 7 Days | 28 Days |
| 1 | 6140 | 72 (5) | 15 min | 21 min | 4870 | 7590 | 10770 | 292 coulombs |
| 2 | 6172 | 64 (5) | 15 min | 21 min | 4900 | 7690 | 10900 | 194 coulombs |
| 3 | 7363 | 55 (5) | 37 min | 1 hr 2 min | 1100 | 11200 | 12070 | 117 coulombs |
| 4 | 5604 | 65 (5) | 17 min | 24 min | 5010 | 8130 | 10820 | 406 coulombs |
| 5 | 5816 | 59 (5) | 15 min | 20 min | 3900 | 6600 | 10610 | 591 coulombs |

The C109 test protocol was altered with w/c=0.40 and cement/sand ratio at 50/50. The mix design for the concrete was the 7 sack bridge deck formulation mentioned previously.

As Table 5 indicates, all five rapid-setting CSA concretes exhibited a permeability of less than 1000 coulombs at 28 days of air curing, which classifies them as low permeability per ASTM C1202. Mixes with higher amounts of polymer had lower permeability Polymer was added in the lab ball mill as mentioned previous. This confirms that the polymer does reduce chloride ion permeability. The permeability values were higher for Mix 4 and Mix 5, in which the polymer content was reduced because of dilution with water.

TABLE 6

Freeze-thaw resistance of polymer-modified, rapid setting CSA concretes
New York Hard Freeze Thaw
(New York Test Method 502-3P)
Results

| Mix Design | Cycles | Weight | % Loss |
|---|---|---|---|
| 1 | 0 | 1626 | 0.00% |
| 2 | 0 | 1642 | 0.00% |
| 3 | 0 | 1614 | 0.00% |
| 4 | 0 | 1552 | 0.00% |
| 5 | 0 | 1619 | 0.00% |
| 1 | 25 | 1644 | −1.09% |
| 2 | 25 | 1657 | −0.91% |
| 3 | 25 | 1624 | −0.60% |
| 4 | 25 | 1565 | −0.90% |
| 5 | 25 | 1635 | −0.99% |
| 1 | 33 | 1643 | −0.99% |
| 2 | 33 | 1657 | −0.91% |
| 3 | 33 | 1624 | −0.58% |
| 4 | 33 | 1564 | −0.83% |
| 5 | 33 | 1639 | −1.25% |

The freeze-thaw resistance of the concretes was tested using New York Test Method 502-3P. The normal test is typically run for 25 cycles. Here the test was pushed to 33 cycles. The results are described in Table 6. Addition of the Polymer improved the freeze-thaw resistance of a polymer-free witness sample (Mix 1) when compared to Mix 5. Negative values shown in the table above illustrate weight gain in the samples with water. A positive value would illustrate weight loss which all samples above did not occur. Increasing the polymer content (Mix 2 and 3) in the cement shows the hydrophobic characteristic of the polymer. An increase in liquid polymer concentration (Mix 2 and 3) causes a lower weight gain than witness sample (Mix 1). As the dosage of polymer increase, the water intake of each sample decreases as shown through Mixes 1-3.

TABLE 7

Freeze-thaw resistance of rapid setting
CSA concretes with Citric Acid

| | # Cycles | Weight | % Loss | Average % Loss |
|---|---|---|---|---|
| Witness Sample Unmodified Cement | | | | |
| Sample A | 0.0 | 1519.1 | 0.00% | 0.00% |
| Sample B | | 1526.4 | 0.00% | |
| Sample A | 2 | 1532.5 | −0.88% | −0.84% |
| Sample B | | 1538.6 | −0.80% | |
| Sample A | 10.0 | 1521.7 | −0.17% | −0.61% |
| Sample B | | 1542.3 | −1.04% | |
| Sample A | 14.0 | 1499 | 1.32% | 0.53% |
| Sample B | | 1530.4 | −0.26% | |
| Sample A | 29.0 | 1462.7 | 3.71% | 2.65% |
| Sample B | | 1502.1 | 1.59% | |
| Sample A | 50.0 | 1452.5 | 4.38% | 3.05% |
| Sample B | | 1500.1 | 1.72% | |
| Modified Cement Sample with Citric Acid | | | | |
| Sample C | 0 | 1501.7 | 0.00% | 0.00% |
| Sample D | | 1502.5 | 0.00% | |
| Sample C | 2 | 1521.1 | −1.29% | −1.42% |

TABLE 7-continued

Freeze-thaw resistance of rapid setting
CSA concretes with Citric Acid

| | # Cycles | Weight | % Loss | Average % Loss |
|---|---|---|---|---|
| Sample D | | 1525.9 | −1.56% | |
| Sample C | 10 | 1552.5 | −3.38% | −3.70% |
| Sample D | | 1563 | −4.03% | |
| Sample C | 14 | 1548.9 | −3.14% | −3.56% |
| Sample D | | 1562.3 | −3.98% | |
| Sample C | 29 | 1537.4 | −2.38% | −2.26% |
| Sample D | | 1534.7 | −2.14% | |
| Sample C | 50 | 1528 | −1.75% | −2.06% |
| Sample D | | 1538.1 | −2.37% | |

Additional freeze-thaw resistance in concrete can be provided by adding citric acid. Results from Table 7 were tested using New York Test Method 502-3P. The normal test is typically run out to 25 cycles. Here the test was run further to 50 cycles. Addition of citric acid improved the freeze-thaw resistance of the witness samples A and B when compared to samples C and D. Negative values shown in the table above illustrate weight gain in the samples with water. A positive value would illustrate weight loss which samples A and B exhibited after the $14^{th}$ cycle. Samples C and D with citric acid had weight gain over the course of 50 cycles.

Examples of Additives Suitable for the Manufacturing of LPRSC

A number of additives can be used in the manufacturing of low permeability rapid setting concrete. The list includes but is not limited to, the following commercial or non-commercial additives BASF Melflux 2651F—Polycarboxylate based polymer (Carboyxlate-based polymerisate). This is a high range water reducer which is commercially available to concrete producers. This additive primarily is used to increase the flow of the mortar/concrete material.

BASF Melment F10—Polymerized melamine sulfonate. This is a medium-range water reducer which is also commercially available to concrete producers. This additive like the one above is used to increase the flow of the mortar/concrete material.

Citric Acid—Granular or liquid form. This additive is used to slow down hydration of a rapid-setting, otherwise non polymer-modified cement, concrete or mortar. This provides a longer working time which extends the initial and final set of the material. Citric acid may be added in the finish mill at the cement production facility.

II. LOW PERMEABILITY POLYMER-FREE CALCIUM SULFOALUMINATE CEMENT

A low permeability calcium sulfoaluminate cement may also be manufactured without any polymer or other additive, through careful and controlled optimization of the particle size distribution of the cement. Specifically, by minimizing the amount of larger particles having a diameter greater than 70 microns, or greater than 50 microns, permeability is significantly reduced. As one example, using a calcium sulfoaluminate cement wherein 98.36% pass through a 325 Mesh provides a permeability of 421 Coulombs. The chloride ion permeability of three cements of identical chemical composition but varying particle size distributions is presented below.

FIG. 1 shows the mass frequency percent of cement particles for calcium sulfoaluminate cement of a first sample.

The majority of the particles in the calcium sulfoaluminate cement in FIG. 1 are about 10 microns in diameter.

A cement suitable for a low permeability application may have the following elemental analysis. The cement generally has a Blaine fineness of 5,500-7,500 with a 325 sieve fineness >98% passing. The table below shows the analysis of the three different samples graphed in FIGS. 1 and 2. Each sample (labeled RAPID-SET CEMENT) is a calcium sulfoaluminate cement

TABLE 8

| Identification SAMPLE Component | 000-087.SMP RAPID-SET CEMENT % | 000-088.SMP RAPID-SET CEMENT % | 000-089.SMP RAPID-SET CEMENT % |
|---|---|---|---|
| Wet Chemistry Analysis | | | |
| SiO2 | 15.14 | 15.08 | 13.62 |
| Al2O3 | 15.12 | 15.43 | 15.77 |
| Fe2O3 | 1.19 | 1.38 | 1.68 |
| CaO | 48.18 | 48.46 | 49.50 |
| MgO | 1.99 | 1.79 | 1.99 |
| SO3 | 14.63 | 14.17 | 13.96 |
| K2O | 0.46 | 0.47 | 0.00 |
| Na2O | 0.19 | 0.20 | 0.00 |
| Total Alkalies | 0.45 | 0.51 | 0.00 |
| LOI | 2.47 | 2.25 | 2.20 |
| SUM | 99.38 | 99.24 | 98.72 |
| Physical Analysis | | | |
| Blaine | 6137 cm2/g | 5900 cm2/g | 5851 cm2/g |
| Mesh (−325) | 98.36% | 97.71% | 91.73% |
| Chemistry Chlorides | | | |
| Water Solubles | 370 ppm | 390 ppm | 300 ppm |
| Acid Chlorides | 809 ppm (0.0809%) | 950 ppm (0.0950%) | 662 ppm (0.0662%) |
| XRD | | | |
| CSA | 23.48% | 23.43% | 24.09% |
| CS | 10.23% | 8.43% | 9.39% |
| Permeability ASTM C1202 | | | |
| 28 Days Air Cure | 421 Coulombs | 1580 Coulombs | 3106 Coulombs |

In the samples 087, 088 and 089 in Table 8 above, the Blaine surface areas are 6137, 5900 and 5851 $cm^2/g$, and the permeabilities are 421, 1580 and 3106 Coulombs, respectively. Relatively small changes in Blaine number appear to result in relatively large changes in permeability. However, a Blaine measurement is a relatively rough and imprecise measurement that does not account for particle size distribution. The percentage of particles passing through a 325 mesh are 98.36%, 97.71% and 91.73%, respectively, for the above-mentioned permeabilities. These results show that optimizing the particle size distribution by removing the largest particles, without necessarily significantly altering the fine fraction of the cement, can reduce chloride ion permeability.

Figure 1:
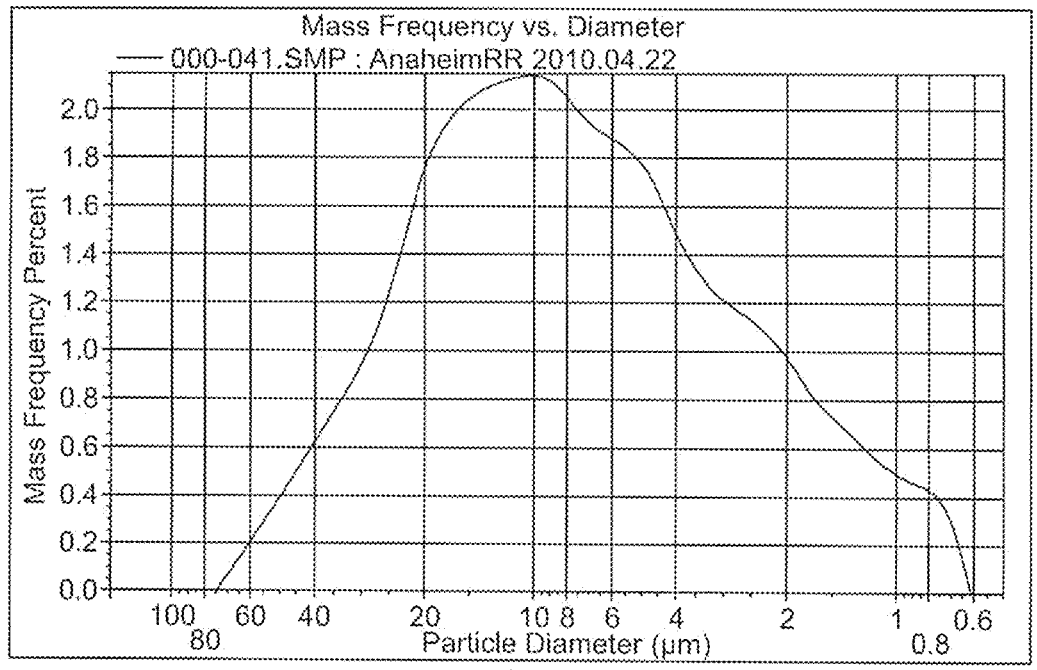

More specifically and referring to FIG. 1, the 088 and 089 samples have a much higher percentage of particles over 50 microns than sample 087. As shown in Table 8, these samples also have much higher permeability than sample 087. These significant variations in permeability are not explained by any variations in cement chemistry. The chemical compositions of all three cements, in term of oxide equivalents, crystalline compounds and total and soluble chlorides, were similar.

Figure 2:
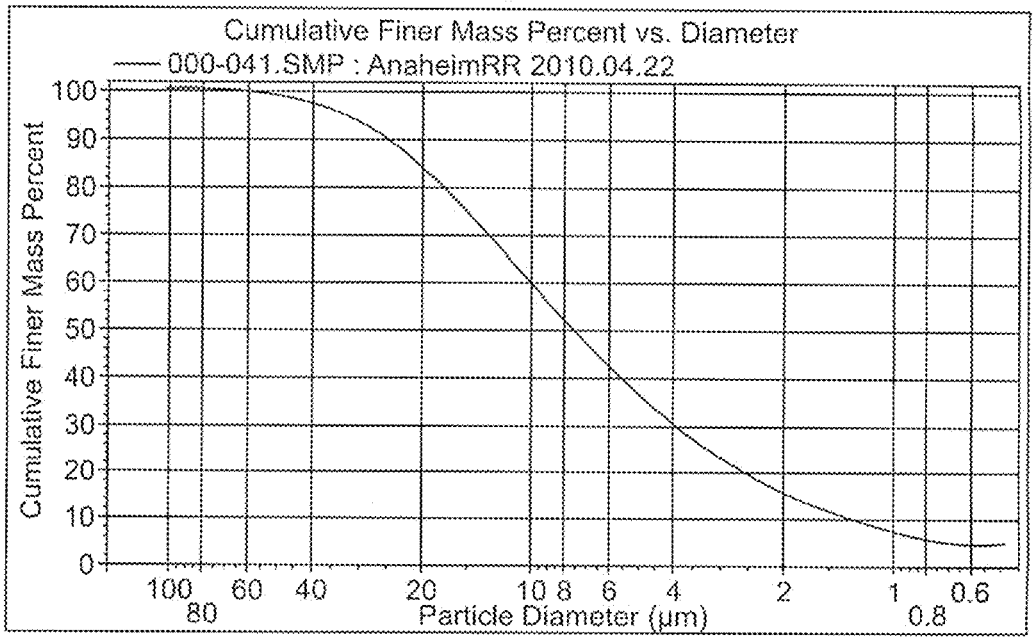
FIG. 2 shows the percentage of particles of any given size, for the same cement as shown in FIG. 1.
Figure 3:
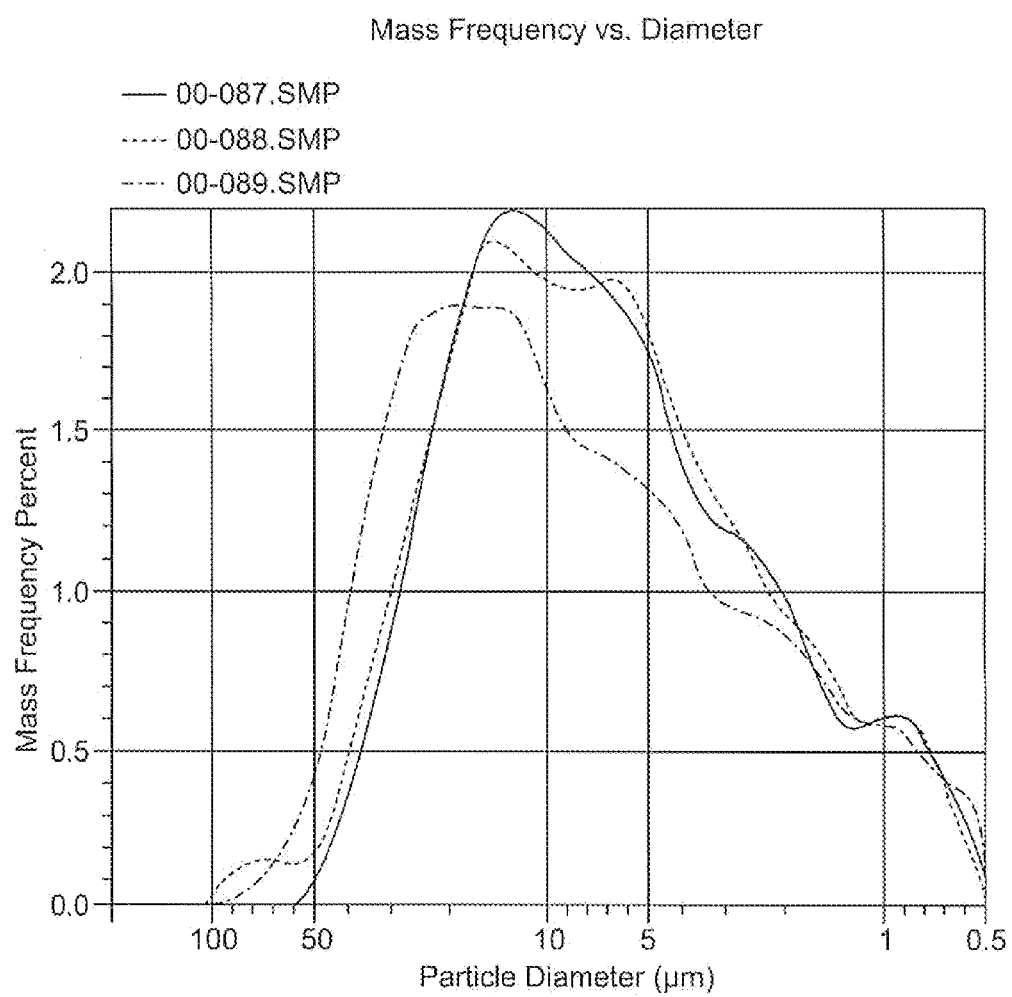
FIG. 3 shows the mass frequency percent of cement particles for three additional samples of calcium sulfoaluminate cement.
Figure 4:
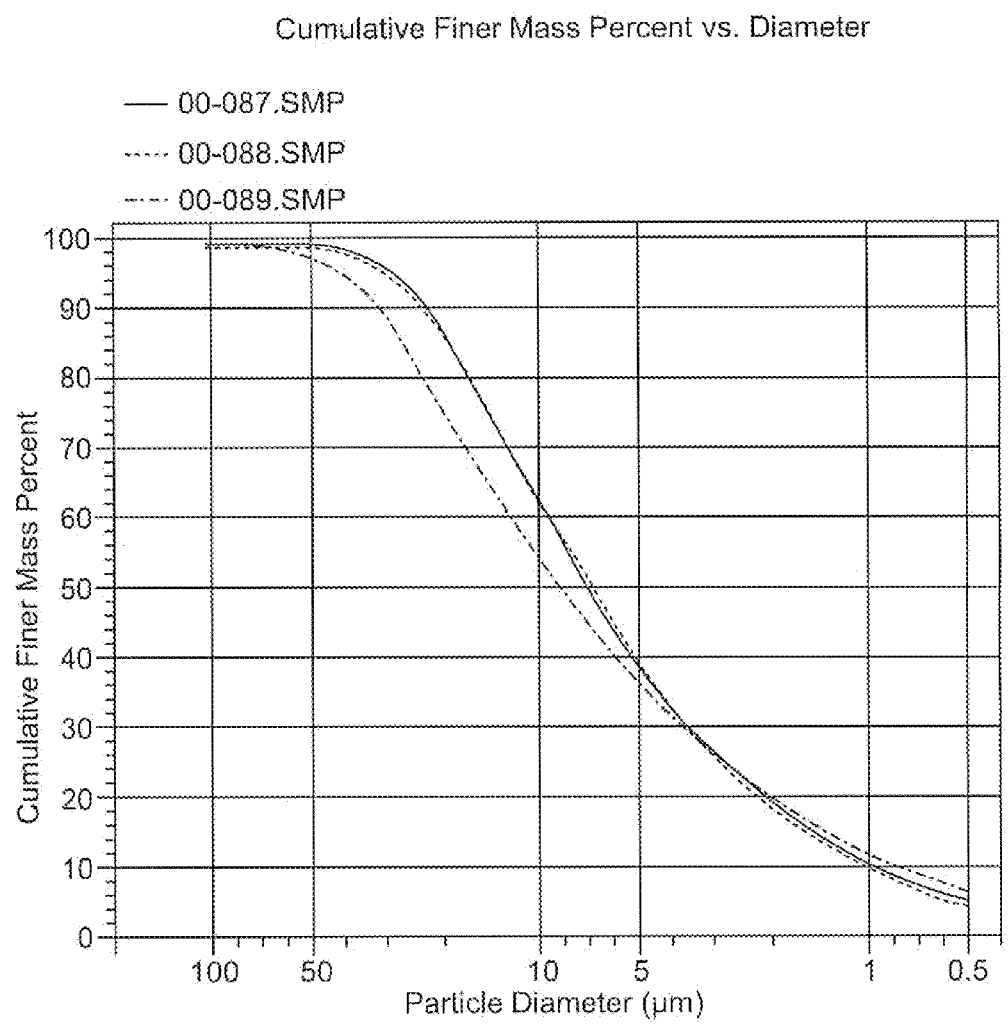
FIG. 4 shows the percentage of particles of any given size, for the same cements as shown in FIG. 3.

Many government agencies, such as the transportation departments of various U.S. states, specify a permeability of less than 1000 Coulombs at the age of 28 days for bridge decks and other structures. This permeability can be achieved without the use of polymers or additive, through careful selection of particle fractions and particle size distribution, in the linker grinding process. FIG. 1 suggests that this may be achieved, without any polymer or other additives, using a cement where particles greater than 70 microns comprise less than 0.05% by mass of the cement, or where particles greater than 50 microns comprise less than 0.1% of the mass frequency. FIG. 2 suggests that a permeability of less than 1000 Coulombs may be achieved with calcium sulfoaluminate cement where at least 60% of the particles have a diameter less than 10 microns and at least 10% of the particles have a diameter less than 1 micron.

Cement Milling and Grinding

Cement is traditionally made by grinding cement clinker, gypsum, and other additives in a finish mill to obtain desired product fineness. Typically, a tube mill, commonly referred to as a ball mill is used for this purpose. New technologies of finish mills include vertical roller mills (VRM) may also be used. Ball mills are cylindrical steel shells lined with high chrome alloys used to protect the outer shells. The mills are positioned horizontally, connected to a drive motor, which turns the mill about its longitudinal axis.

Most modern ball mills are two chamber mills with a diaphragm separating the two compartments. The cements described can be successfully produced in single or two chamber mills. In a two-chamber mill, the first chamber is typically approximately 30% of the total length of the mill and is filled with hardened steel or high chrome alloy balls ranging in size from 50 mm to 90 mm.

Clinker and gypsum enter the mill through a feed chute from a main clinker feed belt conveyor in a predetermined ratio to meet product specifications—typically gypsum makes up 5-9% of the feed to the mill. The feed to this main conveyor belt is controlled by calibrated scales and variable speed drives on the belts transporting clinker and gypsum from storage bins. In addition to the clinker and gypsum, various chemical additives (liquid Polymer, citric acid, or any other additives) may be introduced in a liquid phase deposited directly on the clinker/gypsum mixture via pumps and discharge lines.

As the clinker and gypsum passes through the first chamber, it is reduced in size by the grinding action of the balls and also between the particles themselves. The first chamber is used to break clinker nodules, which may exceed 200 mm. When the clinker is reduced to adequate size, typically around 2-3 mm, it passes through slots in the diaphragm and enters the second compartment for further grinding and size reduction.

The finely ground powder is swept through the mill via fans into a separator to segregate the larger particles of cement from those that meets predetermined density and fineness specification. The larger particles are then reintroduced to the finish mill and re-circulated through the process until the particle size distribution and fineness is achieved. The circulating load of material ranges from 200-300% using a mechanical separator. Typical target specifications for low permeable cement are typically a Blaine of 6,200-7,000 cm2/g with >98% passing a 325 mesh screen.

Thus, novel materials and methods have been described. Various changes and substitutions may of course be made without departing from the spirit and scope of the invention. The invention, therefore, should not be limited except by the following claims, and their equivalents. In the claims below, the content of any dependent claim may be combined with the content any independent claim, as if the dependent claims were multiply dependent.

The invention claimed is:

1. A corrosion resistant steel reinforced concrete structure, comprising:
   steel reinforcement elements entirely contained within a concrete matrix, the concrete matrix comprising:
   a mixture of calcium sulfoaluminate cement particles, aggregate and water;
   wherein particles with a diameter of less than 1 micron comprise at least 10% by mass of the cement particles, and particles with a diameter of less than 10 microns comprise at least 60% by mass of all of the cement particles.

2. The structure of claim 1 wherein 97% of the cement particles are less than 40 microns.

3. The structure of claim 2 wherein 85% of the cement particles are less than 20 microns.

4. The structure of claim 3 wherein 35% of the cement particles are less than 5 microns.

5. The structure of claim 4 wherein 15% of the cement particles are less than 2 microns.

6. The structure of claim 5 wherein 8% of the cement particles are less than 1 micron.

7. A corrosion resistant steel reinforced concrete structure, comprising:
   steel reinforcement elements entirely contained within a concrete matrix, the concrete matrix comprising:
   a mixture of calcium sulfoaluminate cement particles, aggregate and water;
   wherein cement particles with a diameter of more than 70 microns comprise less than 0.05% by mass of the cement particles, and particles with a diameter of more than 50 microns comprise less than 0.1% by mass of the cement particles.

8. The structure of claim 7 wherein 97% of the cement particles are less than 40 microns.

9. The structure of claim 8 wherein 85% of the cement particles are less than 20 microns.

10. The structure of claim 9 wherein 35% of the cement particles are less than 5 microns.

11. The structure of claim 10 wherein 15% of the cement particles are less than 2 microns.

12. The structure of claim 11 wherein 8% of the cement particles are less than 1 micron.

13. The structure of claim 1 with the mixture having an ASTM C1202 Rapid Chloride Ion Penetration 28 days of less than 1000 coulombs.

14. The structure of claim 1 with the calcium sulfoaluminate cement particles comprising 10-25% of the total mixture, and the aggregate comprising 10-70% fine aggregate and 10-70% of coarse aggregate, by weight.

* * * * *